(12) United States Patent
Lasserre et al.

(10) Patent No.: US 11,317,108 B2
(45) Date of Patent: *Apr. 26, 2022

(54) METHOD AND DEVICE FOR DECODING A COLOR PICTURE

(71) Applicant: INTERDIGITAL VC HOLDINGS, INC., Wilmington, DE (US)

(72) Inventors: Sebastien Lasserre, Thorigne Fouillard (FR); Fabrice Leleannec, Cesson-Sevigne (FR); Yannick Olivier, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/655,558

(22) Filed: Oct. 17, 2019

(65) Prior Publication Data

US 2020/0053373 A1    Feb. 13, 2020

Related U.S. Application Data

(63) Continuation of application No. 15/546,336, filed as application No. PCT/EP2016/051706 on Jan. 27, 2016, now Pat. No. 10,455,245.

(30) Foreign Application Priority Data

Jan. 30, 2015 (EP) .................................... 15305147

(51) Int. Cl.
*H04N 19/44* (2014.01)
*H04N 19/30* (2014.01)
(Continued)

(52) U.S. Cl.
CPC ........... *H04N 19/44* (2014.11); *H04N 19/126* (2014.11); *H04N 19/136* (2014.11);
(Continued)

(58) Field of Classification Search
None
See application file for complete search history.

(56) References Cited

U.S. PATENT DOCUMENTS

| 5,008,741 A | 4/1991 | Knierim et al. |
| 5,909,254 A | 6/1999 | Feig et al. |

(Continued)

FOREIGN PATENT DOCUMENTS

| CN | 101953166 A | 1/2011 |
| CN | 102388612 A | 3/2012 |

(Continued)

OTHER PUBLICATIONS

Rudat, C., Helmrich, C. R., Lainema, J., Nguyen, T., Schwarz, H., Marpe, D., & Wiegand, T. (Nov. 2019). Inter-component transform for color video coding. In 2019 Picture Coding Symposium (PCS) (pp. 1-5). IEEE. (Year: 2019).*

(Continued)

*Primary Examiner* — Michelle M Entezari
(74) *Attorney, Agent, or Firm* — Invention Mine LLC

(57) ABSTRACT

The present disclosure generally relates to a device and a method of decoding a color picture from a bitstream. It comprises:
  obtaining an expanded range luminance as a first component by applying a nonlinear dynamic expansion function to a luminance component obtained from the bitstream, wherein said nonlinear dynamic expansion function is determined depending on an inverse of a dynamic reduction function that has been applied to an original luminance component obtained when encoding the color picture;
  obtaining a second component by calculating a square root of a difference between a value determined by the first component and another value computed as a linear combination of a multiplication product of two chromi-
(Continued)

nance components and square values of the two chrominance components obtained from the bitstream; and obtaining at least one color component of the color picture to be decoded at least from said second component and said two chrominance components by determining said at least one color component as a linear combination of the second component and the two chrominance components.

22 Claims, 6 Drawing Sheets

(51) Int. Cl.
H04N 19/136 (2014.01)
H04N 19/186 (2014.01)
H04N 19/126 (2014.01)
H04N 19/98 (2014.01)

(52) U.S. Cl.
CPC ........... *H04N 19/186* (2014.11); *H04N 19/30* (2014.11); *H04N 19/98* (2014.11)

(56) References Cited

U.S. PATENT DOCUMENTS

| | | |
|---|---|---|
| 8,514,934 B2 | 8/2013 | Ward et al. |
| 8,611,421 B1 | 12/2013 | Efremov et al. |
| 8,787,685 B2 | 7/2014 | Amonou et al. |
| 9,374,589 B2 | 6/2016 | Ten et al. |
| 2006/0146191 A1 | 7/2006 | Kim et al. |
| 2007/0153019 A1 | 7/2007 | Nakasone et al. |
| 2008/0175495 A1 | 7/2008 | Segall |
| 2009/0003457 A1* | 1/2009 | Liu ............. H04N 19/196 375/240.25 |
| 2009/0046207 A1* | 2/2009 | Salvucci ......... H04N 19/186 348/663 |
| 2009/0175338 A1* | 7/2009 | Segall ............ H04N 19/30 375/240.14 |
| 2009/0180027 A1 | 7/2009 | Jang et al. |
| 2010/0080459 A1 | 4/2010 | Dai et al. |
| 2010/0214393 A1 | 8/2010 | Funke et al. |
| 2010/0309974 A1 | 12/2010 | Reznik |
| 2014/0037206 A1* | 2/2014 | Newton ........... H04N 1/646 382/166 |
| 2015/0063449 A1 | 3/2015 | Pearson et al. |
| 2015/0245030 A1* | 8/2015 | Mrak ............. H04N 19/61 375/240.03 |
| 2018/0249166 A1 | 8/2018 | Leleannec et al. |

FOREIGN PATENT DOCUMENTS

| | | |
|---|---|---|
| CN | 102667757 A | 9/2012 |
| CN | 104041036 A | 9/2014 |
| EP | 2406959 | 1/2012 |
| JP | 2012520619 A | 9/2012 |
| JP | 2015503873 A | 2/2015 |
| RU | 2409008 | 1/2011 |
| WO | WO2010105036 | 9/2010 |
| WO | 2012142285 A2 | 10/2012 |
| WO | WO2012147010 A1 | 11/2012 |
| WO | WO2013103522 | 7/2013 |
| WO | 2013160697 A1 | 10/2013 |

OTHER PUBLICATIONS

François, E., Fogg, C., He, Y., Li, X., Luthra, A., & Segall, A. (2015). High dynamic range and wide color gamut video coding in HEVC: Status and potential future enhancements. IEEE Transactions on Circuits and Systems for Video Technology, 26(1), 63-75. (Year: 2015).*

Okuda M, Adami N. Two-layer coding algorithm for high dynamic range images based on luminance compensation. Journal of Visual Communication and Image Representation. Oct. 1, 2007; 18(5):377-86. (Year: 2007).*

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Koohyar Minoo et al., "Draft test model for HDR extension of HEVC", 113. MPEG Meeting; Oct. 19, 2015-Oct. 23, 2015; Geneva; (Motion Picture Expert Group or ISO/IEC JTC1/SC29/WG11),,No. m37479, Oct. 21, 2015.

Luthra et al., "Draft Requirements and Explorations for HDR and WCG Content Distribution", ISO/IEC JTC1/SC29/WG11, Coding of Moving Pictures and Audio. Document MPEG2014/IM34636. Oct. 2014, pp. 1-14.

Lasserre et al., "Single layer low-bit depth EDR video coding with SDR/HDR backward compatibilities", ISO/IEC JTC1/SC29/WG11, Coding of Moving Pictures and Audio, Document MPEG2014/M36083, Geneva, Switzerland, Feb. 2015, pp. 1-7.

Anonymous, "High efficiency video coding", International Telecommunication Union, ITU-T Telecommunication Standardization Sector of !TU, Series H: Audiovisual and Multimedia Systems, Infrastructure of audiovisual services—Coding of moving video, Recommendation ITU-T H.265, Apr. 2013, pp. 1-317.

Lasserre et al., "Modulation-based HDR video coding with SDR backward compatibility", Joint Collaborative Team on Video Coding (JCT-VC) of ITU-T SG 16 WP 3 and ISO/IEC JTC 1/SC 29/WG 11, Document JCTVC-U0085, 21st Meeting, Warsaw, Poland, Jun. 19, 2015, pp. 1-14.

Anonymous, "Parameters values for ultra-tiigh definition television systems for production and international programme exchange", International Telecommunication Union, ITU-R Radiocommunication Sector of ITU, Recommendation ITU-R BT.2020-1, Jun. 2014, pp. 1-8.

Touze et al., "High Dynamic Range Video Distribution Using Existing Video Codecs", Picture Coding Symposium, San Jose, California, USA, Dec. 8, 2013, pp. 349-352.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Xu_etal,_ "High-Dyamic range still image encoding in JPEG 2000," IEEE Computer Graphics and Applications 25, No. 6 2005, pp. 57-62.

Le Leannec et al., "Usage of modulation channel for high bit-depth and floating point signal encoding", Joint Collaborative Team on Video Coding (JCT-VC) of ITU-T SG 16 WP 3 and iSO/IEC JTC 1/SC 29/WG 11, Document JCTVC-R0267, 18th Meeting, Sapporo, Japan, Jun. 30, 2014, pp. 1-12.

Lasserre et al., "High Dynamic Range video coding", Joint Collaborative Team on Video Coding (JCT-VC) of ITU-T SG 16 WP 3 and ISO/IEC JTC 1/SC 29/WG 11, Document JCTVC-P0159, 16th Meeting, San Jose, California, USA, Jan. 9, 2014, pp. 1-10.

Lasserre et al., "Technicolor's response to CfE for HOR and WCG (category 1)", ISO/IEC JTC1/SC29/WG11, Coding of Moving Pictures and Audio, Document MPEG2014/M36263r1, Warsaw, Poland, Jun. 2015, pp. 1-21.

Anonymous, "High Dynamic Range Electro-Optical Transfer Function of Mastering Reference Displays", SMPTE Standard, Document SMPTE ST 2084:2014, Aug. 16, 2014, pp. 1-14.

* cited by examiner

METHOD AND DEVICE FOR DECODING A COLOR PICTURE

This application is a continuation of co-pending U.S. application Ser. No. 15/546,336, filed Jul. 26, 2017 which is a 371 of International Application No. PCT/EP2016/051706 filed Jan. 27, 2016 which claims the benefit of European Patent Application No. 15305147.9, filed Jan. 30, 2015, herein incorporated by reference.

FIELD

The present disclosure generally relates to picture/video encoding and decoding. Particularly, but not exclusively, the technical field of the present disclosure is related to decoding of a picture whose pixels values belong to a high-dynamic range.

BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color components), such as the traditional tri-chromatic RGB representation.

A pixel value is represented by a vector of n values, where n is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OEFT (Optico-Electrical-Transfer-Function) (*Rec. ITU-R BT.*709-5, April 2002) or ITU-R BT.2020 OETF (*Rec. ITU-R BT.*2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device. A color gamut is sometimes defined by RGB primaries defined in the CIE1931 color space chromaticity diagram and a white point.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

High Dynamic Range pictures (HDR pictures) are color pictures whose luminance values are represented with a HDR dynamic that is higher than the dynamic of a SDR picture.

The HDR dynamic is not yet defined by a standard but one may expect a dynamic range up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

Then, a Colorist, usually in conjunction with a Director of Photography, performs a control on the color values of the first color-graded version of the captured picture by fine-tuning/tweaking some color values in order to instill an artistic intent.

The problem to be solved is the distribution of a compressed HDR picture (or video) while, at the same time, distributing an associated SDR picture (or video) representative of a color-graded version of said HDR picture (or video).

A trivial solution is simulcasting both SDR and HDR picture (or video) on a distribution infrastructure but the drawback is to virtually double the needed bandwidth compared to a legacy infrastructure distributing adapted to broadcast SDR picture (or video) such as HEVC main 10 profile ("*High Efficiency Video Coding*", SERIES H: AUDIOVISUAL AND MULTIMEDIA SYSTEMS, Recommendation ITU-T H.265, *Telecommunication Standardization Sector of ITU*, April 2013).

Using a legacy distribution infrastructure is a requirement to accelerate the emergence of the distribution of HDR pictures (or video). Also, the bitrate shall be minimized while ensuring good quality of both SDR and HDR version of the picture (or video).

Moreover, backward compatibility may be ensured, i.e. the SDR picture (or video) shall be viewable for users equipped with legacy decoder and display, i.e. in particular, overall perceived brightness (i.e. dark vs. bright scenes) and perceived colors (for instance, preservation of hues, etc.) should be preserved.

Another straightforward solution is to reduce the dynamic range of the HDR picture (or video) by a suitable non-linear function, typically into a limited number of bits (say 10 bits), and directly compressed by the HEVC main10 profile. Such non-linear function (curve) already exist like the so-called PQ EOTF proposed by Dolby at SMPTE (*SMPTE standard: High Dynamic Range Electro-Optical Transfer Function of Mastering Reference Displays*, SMPTE ST 2084:2014).

The drawback of this solution is the lack of backward compatibility, i.e. the obtained reduced version of the picture (video) has not a sufficient visual quality to be considered as being viewable as a SDR picture (or video), and compression performance are somewhat poor.

The present disclosure has been devised with the foregoing in mind.

SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

In particular, an encoding side and a decoding side of a distribution scheme are described for the encoding and the decoding of a picture or a sequence of pictures. It comprises, on the encoder side, mapping, for example, an HDR picture onto a SDR picture represented in a format compatible with the legacy SDR workflow. Exemplary, but not limited to, the format may be the 8-bit YUV format dedicated to High Definition TV (as defined by the standard ITU-R Rec BT.709) or the 10-bit YUV format dedicated to Ultra High Definition TV (as defined by the standard ITU-R Rec BT.2020). It further comprises encoding the obtained SDR picture by using a legacy SDR image coder. For instance, but not limited to, the coder may be the standard 8-bit h264/AVC main profile or the standard 10-bit HEVC main10 profile of, e.g., HEVC (or any other codec workable by the workflow). Further, the distribution scheme comprises distributing the bit-stream of the obtained encoded SDR picture.

On the decoder side, two scenarios are possible depending on the addressed user.

In a first scenario, a decoded SDR picture is obtained from the distributed bit-stream and is displayed on a SDR-capable device.

In a second scenario, a decoded HDR picture is obtained from the distributed bit-stream by first obtaining a decoded SDR picture and by second applying a mapping from the decoded SDR picture to the decoded HDR picture.

Advantageously, the mapping from a HDR picture to a SDR picture performed by the encoder is invertible such that the inverse mapping from a SDR picture to a HDR picture is applied by the decoder. By doing so, the coding error of the decoded HDR picture, relatively to the HDR picture, is minimized.

An embodiment of an invertible HDR to SDR mapping is described hereafter and is based on a three-step process in which a square-root is used as EOTF.

As shown in FIG. 1, a method 100 of encoding a color picture comprises a luminance dynamic reduction (step 110) that comprises a sub-step 111 of obtaining an original luminance Y from at least one of color components Ec (c=1, 2, 3) of the color picture and a sub-step 112 of histogram analysis in order to determine a modulation value (also called backlight value) Ba for the picture to be encoded. Different methods can be used to calculate the modulation value, for example, but not limited to, using an average, median, minimum or maximum value of the HDR luminance. These operations may be performed in the linear HDR luminance domain $Y_{HDR,lin}$ or in a non-linear domain like $\ln(Y_{HDR,lin})$ or $Y_{HDR,lin}^\gamma$ with $\gamma<1$.

A color picture is considered as having three color components in which the pixel values of the color picture are represented. The present disclosure, although at least partly explained by way of concrete example, is not limited to any color space in which the three components are represented but extends to any color space such as RGB, CIELUV, XYZ, CIELab, etc. As an example, Ec refers to $RGB_{HDR}$ in the Figures. In a sub-step 113, the dynamic of the original luminance Y dynamic is reduced to obtain a luminance component L from the original luminance Y and the modulation value Ba by applying a non-linear function that depends on from the original luminance Y and the modulation value Ba.

In a second step 120, two chrominance components C1 and C2 are determined from the color components Ec of the color picture. For the example given in FIG. 1, C1 and C2 refer to U'V', whereas Ec refers to $RGB_{HDR}$. In a sub-step 121, intermediated components Dc (in the example of FIG. 1, Dc refers to $R^\#B^\#G^\#$) are obtained by taking the square root of the color components Ec. For the example shown in FIG. 1, this refers to the square root of $RGB_{HDR}$. In a next sub-step 122, reduced components Fc ($\tilde{R}\tilde{G}\tilde{B}$ for the example shown in FIG. 1) are obtained by a multiplication of the intermediate components Dc by a common multiplicative factor β". The factor β"(Ba,L) depends on the luminance component L and the modulation value Ba. In a next sub-step 123, chrominance components C1 and C2 (U' and V' in FIG. 1) are obtained by multiplying the three reduced components Fc by a matrix, i.e.

$$[C1;C2]=M[F1;F2;F3]$$

where M is a 2×3 matrix that depends on the gamut of the color picture.

In a third step 130, a correction of the luminance component L and the chrominance components C1, C2 is performed to obtain the corrected luminance component L' and the corrected chrominance components C'1 and C'2 (which refers to U'V' to L'U"V" in the figures) This correction obtained by a gamut mapping such that the perceived colors of the gamut G1 of the corrected components L', C'1, C'2 correspond to the perceived color of the gamut G2 of the components Ec of the HDR color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent said color.

For example, when a CIELUV color space is used, the saturation $s_{uv}$ is defined as the ratio between the chroma $C^*_{uv}$ over the luminance $L^*$.

$$s_{uv} = \frac{C^*_{uv}}{L^*} = \frac{\sqrt{u^{*2} + v^{*2}}}{L^*}$$

The hue is then given by $$h_{uv} = \arctan\frac{v^*}{u^*}$$

According to another example, when a CIELAB color space is used, the saturation is defined as the ratio of the chroma over the luminance:

$$s_{ab} = \frac{C^*_{ab}}{L^*} = \frac{\sqrt{a^{*2} + b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color. In step 150, scaling the color components Ec by a same factor preserves this angle, thus the hue.

Now let us consider that the HDR color picture is represented in the CIELUV color space and a picture I2 that is formed by combining together the luminance component L, whose dynamic range is reduced compared to the dynamic range of the luminance of the color picture I (step 130), and two chrominance components U (=C1) and V (=C2) of the CIELUV color space. The colors of the picture I2 are thus differently perceived by a human being because the saturation and the hue of the colors changed. The method (step 130) determines the chrominance components C'1 and C'2 of a corrected picture I3 in order that the hue of the colors of the corrected picture I3 best match the hue of the colors of the HDR color picture.

In a sub-step 131, 132, the common multiplicative factor β" used in the second step 120 is determined. In a next sub-step 133, L' is generated from L.

The corrected components L', C'1, C'2 are obtained from the luminance component L and the chrominance components C1, C2 by the following equations $$C'1 = C1,$$

$$C'2 = C2,$$

$$L' = L - mC'1 - nC'2$$

where m and n are two real coefficients and refer to a and b in the Figure. The real coefficients depend on the gamut of the HDR Rec BT.709 and Bt.2020). Typical values for m and n are m≈n in the interval [0.1,0.5].

According to a variant of the correction, the values of the corrected luminance component L' are always lower than the values of the luminance component L:

$$L' = L - \max(0, mC'_1 + nC'_2)$$

This ensures that the values of the corrected luminance component L' do not exceed the values of the luminance component L and thus ensures that no color saturation occurs. The modulation value Ba is encoded in the bitstream F as well as the picture L'C'1C'2.

As shown in FIG. 2, a corresponding method 200 of decoding a color picture from a bitstream is schematically illustrated. Decoding Steps 210, 220 and 230 may be regarded as inverting the corresponding encoding steps 110, 120 and 130. In step 230, corrected luminance and chrominance components L', C'1, C'2 (referring to U'V' in FIG. 2) are obtained from the bitstream F. In a sub step, the luminance component L is obtained by inversing the correction, i.e. by the following equations $$L = L' + mC'1 + nC'2$$

(m and n refer to a and b shown in the Figure)

According to a variant of the inverse correction, the values of the luminance component L are always higher than the values of the corrected luminance component L':

$$L = L' + \max(0, mC'_1 + nC'_2)$$

This embodiment is advantageous because it ensures that the luminance component L does not exceed a potential clipping value that is usually used by the decoder to define a luminance peak.

In step 210, a nonlinear dynamic expansion function is applied to the luminance L in order to generate a first component (Y in FIG. 2 or sqrt(Y) in FIG. 3) which is an expanded range luminance, which is an inverse of a dynamic reduction function that has been applied to an original luminance component obtained when encoding the color picture, e.g. $Y_{HDR} = f^{-1}(L_{SDR})$.

In step 220, at least one color components Ec (in the shown example $RGB_{HDR}$) of the color picture to be decoded are recovered from the corrected chrominance components C'1, C'2 (In the example shown: U'V') and the first component Y (or sqrt(Y)). In a sub-step 221 a multiplication of the corrected chrominance components C'1, C'2 by a common multiplicative factor β' is performed to obtain the intermediate chrominance components ($C1_r, C2_r$, referring $U_r V_r$ shown in the example of FIG. 2 and $\widehat{C1_r}, \widehat{C2_r}$ referring to $\widehat{U_r}, \widehat{U_r}$, shown in FIG. 3), which are used in a further sub-step 222 for obtaining a second component S, i.e., and referring to the component notation used for the example shown in FIG. 2, a value S determined by S=

$\sqrt{Y+k_0 U_r^2 + k_1 V_r^2 + k_2 U_r V_r}$. In a further sub-step 223, $R^\#G^\#B^\#$ are recovered from $SU_rV_r$: $[R^\#;G^\#;B^\#]=Mat_{3\times3}[S; U_r;V_r]$. The color components of the decoded color picture $RGB_{HDR}$ are determined in a next sub-step 224 as the squares of $R^\#G^\#B^\#$.

In other words, the method allows, for example, a SDR to HDR de-mapping that recovers R#G#B# representative of the RGB HDR components, from a SDR luma component L and two SDR chroma components UV, wherein a HDR luminance component Y is deduced from L, a value T is computed as a linear combination of $U^2$, $V^2$ and U*V, S is computed as the square root of Y−T and $R^\#G^\#B^\#$ is then determined as the product of a 3×3 matrix and SUV, applied to each pixel of an input SDR picture. The 3×3 matrix is, for example, the inverse of the RGB->YUV matrix defined in ITU-R BT709/2020, i.e. $C=A^{-1}$.

The described decoding scheme allows the distribution of a compressed HDR picture while, at the same time, distributing an associated SDR picture representative of a color-graded version of said HDR picture However, the decoding can be further enhanced, as compression loss may introduce inaccuracies when decoding and displaying the HDR picture, such that the numerical stability or robustness of the decoding may not always be guaranteed.

The further disclosure sets out to provide a method of decoding a color picture from a bitstream that provides an additional increase in robustness. The method comprises:
  obtaining a first component by applying a nonlinear dynamic expansion function to a luminance component obtained from the bitstream;
  obtaining a second component by taking a square root of a difference between a value determined by the first component and a linear combination of a product and square values of two chrominance components obtained from the bitstream; and
  obtaining at least one color component of the color picture to be decoded at least from said second component and said two chrominance components.

This allows to apply a nonlinear dynamic expansion function which is not necessarily the inverse of the corresponding nonlinear dynamic reduction function that has been applied during encoding, in order to apply a customizable boundary at least to the luminance component, for example to take into account restrictions implied by the processing hardware. Further, the dependency of the square root function on the first component generated by the actually selected nonlinear dynamic expansion function allows to adapt the calculation of the second component not only to the introduced boundary but also to influence the avoidance of a non-defined difference result, thereby enabling enhanced numerical stability.

According to an embodiment,
  the second component is obtained by taking the square root of the difference between the value determined by the first component and said linear combination only if said value is equal to or greater than said linear combination, and
  said second component is set equal to zero and the two chrominance components are multiplied by a common factor otherwise. This allows handling the case of the second component being determined to be a non-real figure. Handling of this error case may otherwise depend on the applied hardware error handling functionality. This exception is resolved by setting the second component to 0. However, replacing an imaginary value by zero is equivalent to increasing the luminance. If the second component would be set to 0 without also applying the common factor to the chrominance components would practically lead to very bright pixels appearing where the second component has been set to zero.

According to one embodiment, the common factor is a ratio of said first component, i.e. the value of said component, over a square root of said linear combination.

In this embodiment, the nonlinear dynamic expansion function is, e.g., an inverse of a dynamic reduction function that has been applied to an original luminance component obtained when encoding the color picture and said value determined by said first component is equal to said original luminance component. In this case, the nonlinear dynamic expansion function provides the original luminance component as said first component and the second component is determined as a square root of the difference between the originally encoded luminance and described linear combination.

According to another embodiment, the common factor is the reciprocal of a square root of said linear combination.

In this embodiment the nonlinear dynamic expansion function is a square root of an inverse of a dynamic reduction function that has been applied to an original luminance component obtained when encoding the color picture, and the value determined by said first component is equal to 1. Further, the obtaining at least one color component of the color picture to be decoded comprises multiplying the at least one color component by the first component. This introduces normalization by the square root of the original luminance component and, thereby, sets boundaries to the chrominance components and the second component, such that hardware implementation can be simplified. Finally, the described multiplication removes the applied normalization.

In order to apply a corresponding scaling to the two chrominance components, according to an embodiment, the step of obtaining the two chrominance components comprises scaling each of the two chrominance components by a factor that depends on the first component.

For example, said scaling comprises dividing the two chrominance components by the first component, i.e. by the same normalization factor that is also applied to the luminance, before determining the linear combination.

In an embodiment, said factor also depends on a backlight value of the picture being decoded, obtained from the original luminance component.

In an embodiment, the second component is determined using a look up table for faster processing.

According to an embodiment, said obtaining at least one color component of the color picture to be decoded at least from said second component and said two chrominance components comprises determining said at least one color component as a linear combination of the second component and the two chrominance components.

Any of the following embodiments may be applied to other other color spaces than RGB or YUV, even if described with example reference to those.

As an example embodiment, a SDR to HDR de-mapping method recovers $R^\#G^\#B^\#$ representative of the RGB HDR components, from a SDR luma component L and two SDR chroma components UV, wherein a HDR luminance component Y is deduced from L, a value T is computed as a linear combination of $U^2,V^2$ and U*V. S is essentially computed as the square root of Y−T i. if T≤Y then S=sqrt(Y−T)
  ii. if T>Y then U and V are multiplied by a common factor F and S is set to zero.

$R^\#G^\#B^\#$ is then computed as a product of a 3×3 matrix and SUV. The method is applied to each pixel of an input SDR image. Further, the common factor F can be set to $Y/\sqrt{T}$.

As another example embodiment, a SDR to HDR de-mapping method recovers $R^\#G^\#B^\#$ representative of the RGB HDR components from a SDR luma component L and two SDR chroma components UV, wherein the square root of the HDR luminance component $\sqrt{Y}$ is deduced from L, T is computed as a linear combination of $U^2$, $V^2$ and $U*V$, and S is essentially computed as the square root of 1−T
  i. if T≤1 then S=sqrt(1−T)
  ii. if T>1 then U and V are multiplied by a common factor F and S is set to zero $\widehat{R^\#}\ \widehat{G^\#}\ \widehat{B^\#}$ is then computed as the product of a 3×3 matrix and SUV. $R^\#G^\#B^\#$ is the multiplication of $\widehat{R^\#}\ \widehat{G^\#}\ \widehat{B^\#}$ by $\sqrt{Y}$, applied to each pixel of an input SDR picture. Further, the common factor F is $1/\sqrt{T}$. In an embodiment, F can be applied at the same time as the final multiplication by $1/\sqrt{T}$, i.e. multiplication by $F/\sqrt{T}$ instead.

The described embodiment allows a simple hardware implementation of the decoder with intermediate register sizes that do not depend on the peak lumianace of the color image According to other of its aspects, the disclosure relates to devices comprising a processor configured to implement the above methods, a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

DESCRIPTION OF EMBODIMENTS

Figure 1:
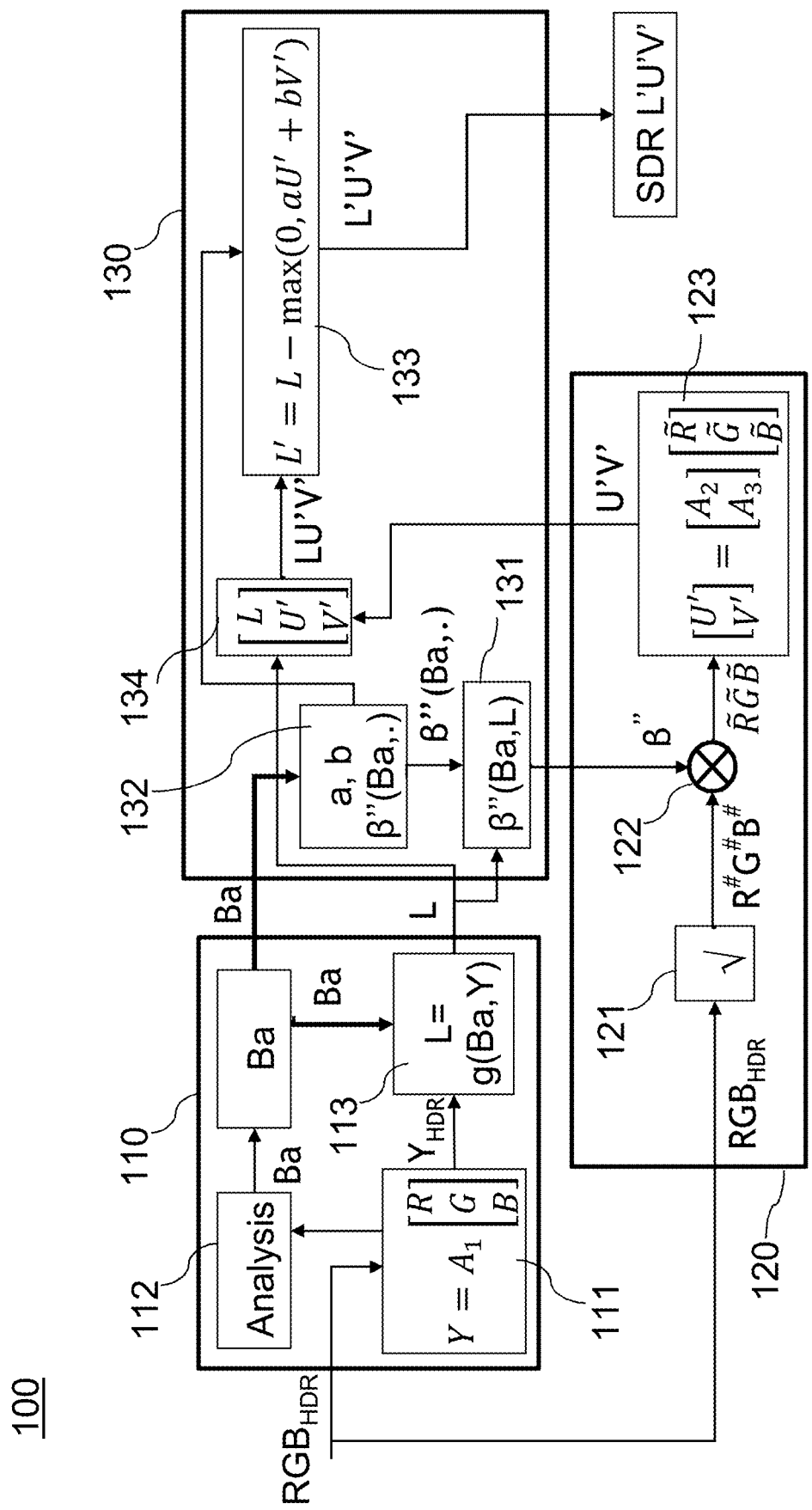
FIG. 1 shows schematically a diagram of the steps of a method of encoding a color picture in accordance with an embodiment of the disclosure.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for decoding a color picture but extends to the decoding of a sequence of pictures (video) because each color picture of the sequence is sequentially decoded as described below.

A color picture I is considered as having three color components in which the pixel values of the color picture are represented. The present disclosure is not limited to any color space in which the three components are represented but extends to any color space such as RGB, CIELUV, XYZ, CIELab, etc.

Figure 2:
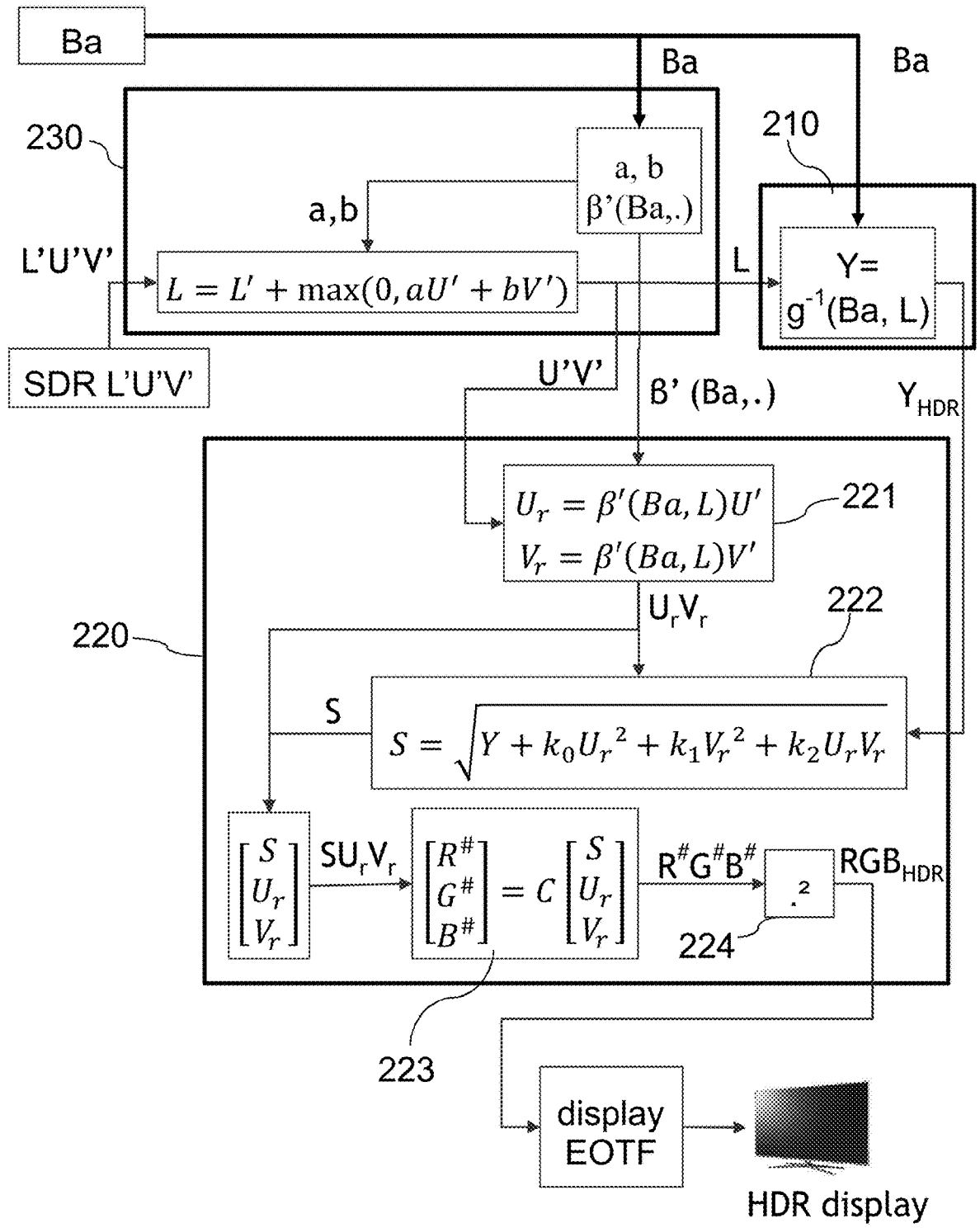
FIG. 2 shows schematically a diagram of the steps of a method of decoding a color picture from at least one bitstream in accordance with an embodiment of the disclosure.
Figure 3:
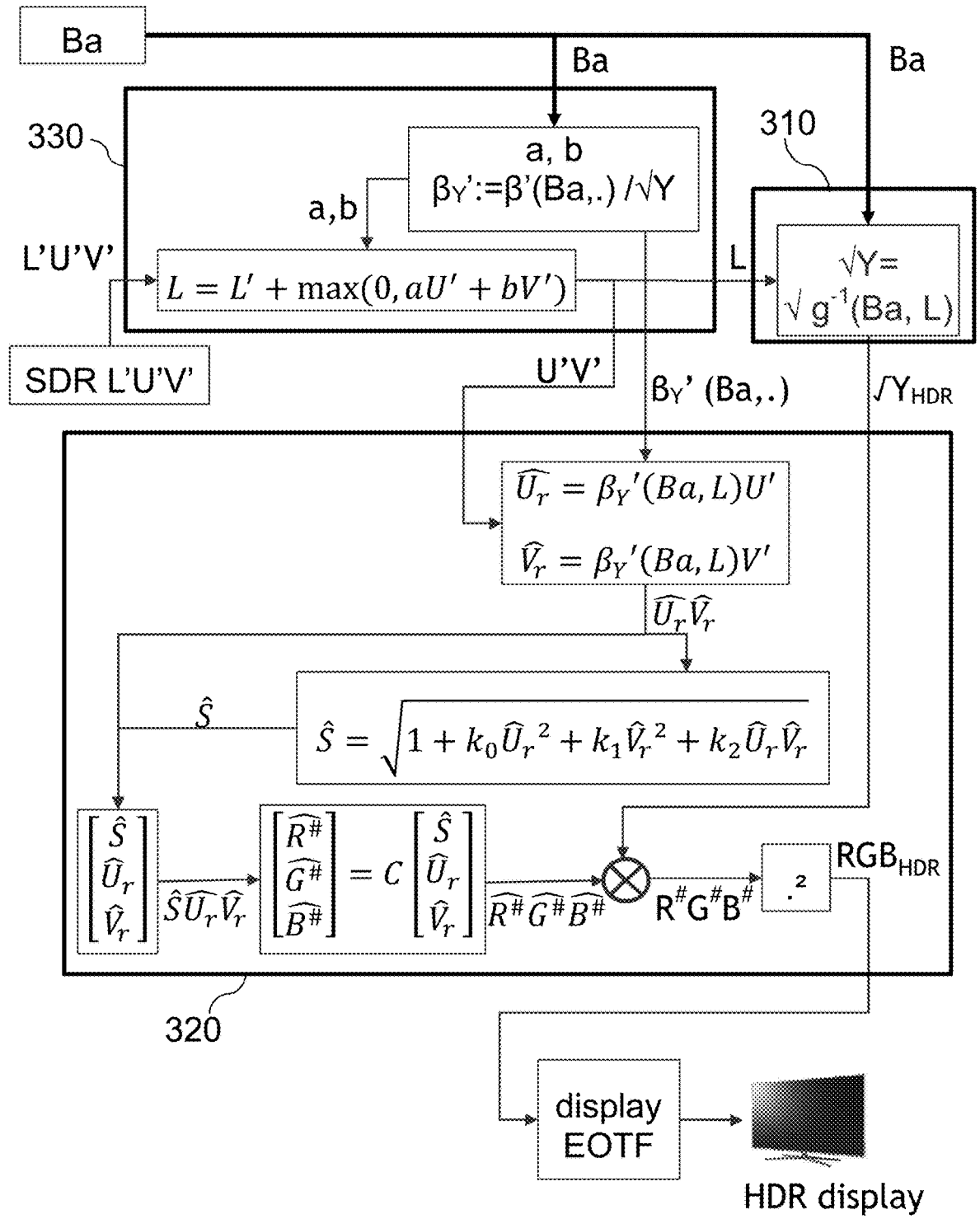
FIG. 3 shows schematically a diagram of the steps of a method of decoding a color picture from at least one bitstream in accordance with another embodiment of the disclosure.

Referring to FIG. 3, a diagram of the steps of a method 300 of decoding a color picture from at least one bitstream in accordance with an embodiment of the disclosure is schematically shown. The shown embodiment is actually a modification of the decoding method illustrated in FIG. 2, now ascertaining that clear bounds are always available for the processed luminance and chrominance components, namely of Y, $U_r$, $V_r$, S. Only changes between the embodiments will be explained in detail. In step 310, the nonlinear dynamic expansion function is a square root of an inverse of a dynamic reduction function that has been applied to an original luminance component obtained when encoding the color picture, which reduces the upper bound of the first component generated in step 1 to $\sqrt{Y}$. Normalization by $1/\sqrt{Y}$ is introduced, followed by a modified chrominance reconstruction step 320 and then a renormalization by $\sqrt{Y}$.

The HDR luminance Y is a linear combination of the components Ec. Hereinafter, as an example of Ec, it is referred to $RGB_{HDR}$.

$$Y = A_1 \begin{bmatrix} R \\ G \\ B \end{bmatrix} = A_1 \begin{bmatrix} R^{\#2} \\ G^{\#2} \\ B^{\#2} \end{bmatrix}$$

where we defined $R^{\#}:=\sqrt{R}$, $G^{\#}:=\sqrt{G}$, $B^{\#}:=\sqrt{B}$

As a consequence, up to some constants, Ec, i.e. RGB in the shown example, are bounded by Y and Dc, i.e. $R^{\#}G^{\#}B^{\#}$ in the shown example, are bounded by $\sqrt{Y}$. Also, as one gets from the encoder side, $U_r, V_r$ as a linear combination of $R^{\#}G^{\#}B^{\#}$, i.e.

$$\begin{bmatrix} A_2 \\ A_3 \end{bmatrix} \begin{bmatrix} R^{\#} \\ G^{\#} \\ B^{\#} \end{bmatrix} = \begin{bmatrix} U_r \\ V_r \end{bmatrix},$$

The two variables are bounded by $R^{\#}G^{\#}B^{\#}$, thus by $\sqrt{Y}$. It follows that, referring back to the embodiment shown in FIG. 2, in the definition of S, $$S = \sqrt{Y + k_0 U_r^2 + k_1 V_r^2 + k_2 U_r V_r}$$

the term under the square root is bounded by Y, and S is bounded by $\sqrt{Y}$. Hence, the input variables $U_r, V_r$, the intermediate variable S, and the output variables $R^{\#}G^{\#}B^{\#}$ of the decoding process are all bounded by $\sqrt{Y}$. Therefore, the multiplicative factor $\beta'$ used in the decoding method illustrated in FIG. 2 is replaced by $\beta_{\gamma'}$ in the embodiment shown in FIG. 3, such that, instead of processing $U_r$ and $V_r$, $U_r/\sqrt{Y}$ and $V_r/\sqrt{Y}$ are processed. Further a re-scaling of the output back by $\sqrt{Y}$ is introduced.

In other words, the multiplicative factor $\beta'(Ba,L)$ is replaced by $\beta_{\gamma'}(Ba,L) := \beta'(Ba,L)/\sqrt{Y}$ in order to get the normalized inputs $\hat{U}_r = U_r/\sqrt{Y}$ and $\hat{V}_r = V_r/\sqrt{Y}$ At the output, the decoded $\widehat{R^{\#}}$ $\widehat{G^{\#}}$ $\widehat{B^{\#}}$ are scaled back by a multiplication by $\sqrt{Y}$.

FIG. 3 illustrates a SDR to HDR inverse mapping method that recovers $R^{\#}G^{\#}B^{\#}$ representative of the RGB HDR components, from a SDR luma component L and two SDR chroma components UV, wherein the square root of the HDR luminance component $\sqrt{Y}$ is deduced from L, a value $\hat{T}$ is computed as a linear combination of $U^2$, $V^2$ and $U*V$, the second component S is computed as the square root of the difference $1-\hat{T}$, and wherein $\widehat{R^{\#}}$ $\widehat{R^{\#}}$ $\widehat{G^{\#}}$ is the product of a 3×3 matrix and SUV and $R^{\#}G^{\#}B^{\#}$ is the multiplication of $\widehat{G^{\#}}$ $\widehat{B^{\#}}$ $\widehat{B^{\#}}$ by $\sqrt{Y}$, applied to each pixel of an input SDR image. Furthermore, U and V are divided by $\sqrt{Y}$.

Figure 4:
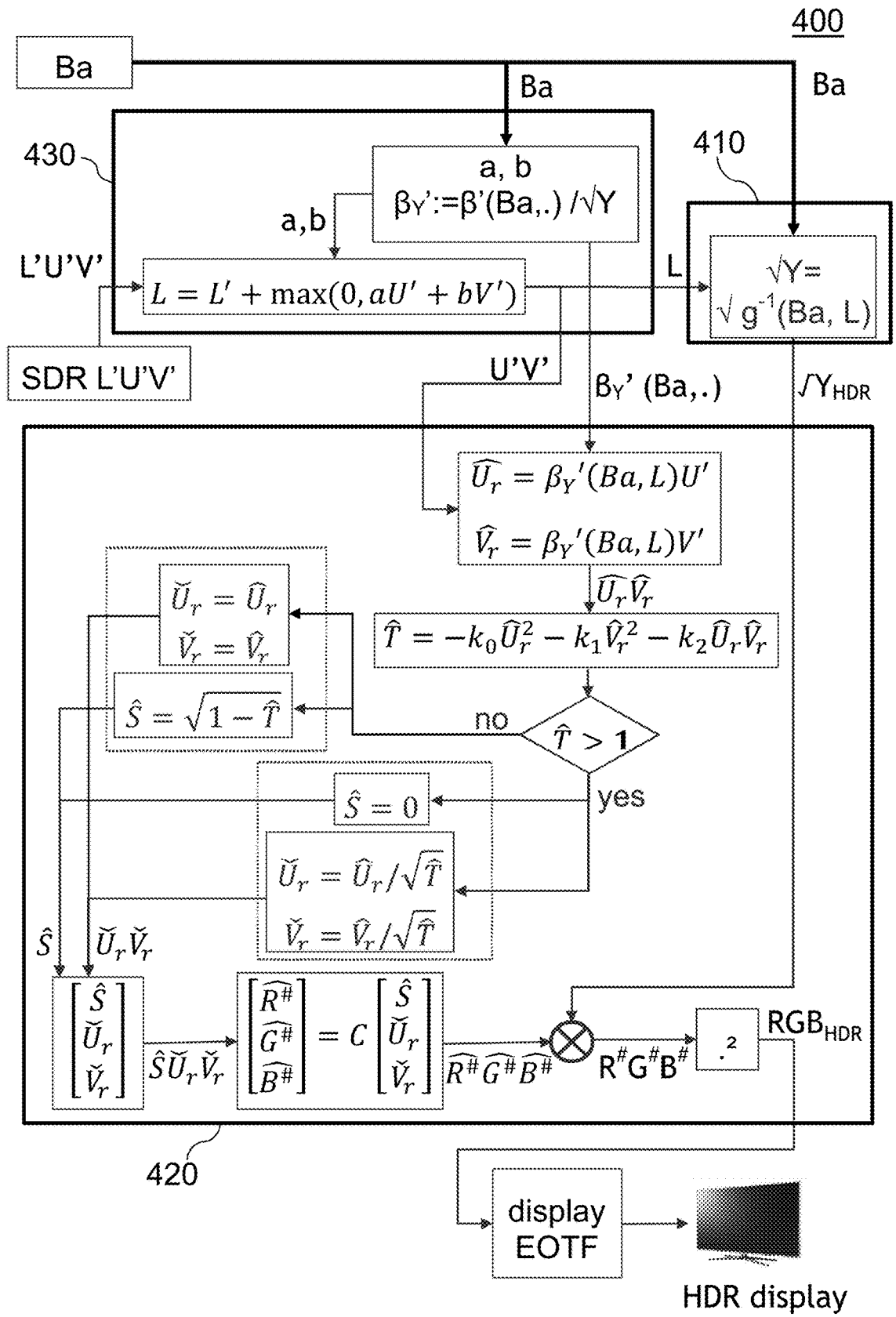
FIG. 4 shows schematically a diagram of the steps of a method of decoding a color picture from at least one bitstream in accordance with yet another embodiment of the disclosure.

Referring now to FIG. 4, a diagram of the steps of a method 400 of decoding a color picture from at least one bitstream in accordance with another embodiment of the disclosure is schematically shown. The shown embodiment is actually a modification of the decoding method illustrated in FIG. 3, now additionally ascertaining that if the second component, corresponding to $\hat{S}$ shown in FIG. 3, results in an imaginary value, the exception is handled correctly, e.g. in order to avoid visible distortions of the displayed color associated to the corresponding pixel. Only changes between the embodiments will be explained in detail.

The mapping is supposed to provide L'U'V' that are decodable in the sense that S is not imaginary. However, because the L'U'V' is compressed and de-compressed, coding loss may lead to an input triplet (L',U'V') such that $1-\hat{T} := 1 + k_0 \hat{U}_r^2 + k_1 \hat{V}_r^2 + k_2 \hat{U}_r \hat{V}_r$ is negative and $\hat{S} = \sqrt{1-\hat{T}}$ is not real. One solution is to threshold $\hat{T}$ by 1, leading to $\hat{S}=0$. However, this destroys the luminance bound on decoded RGB. Replacing an imaginary value by $\hat{S}=0$ is equivalent to increasing Y. For instance, if one gets $\hat{T}=2$, doubling Y leads to $\hat{S}=\sqrt{2-2}=0$. But in this case, the bound Y on RGB has also doubled. This leads to very bright pixels appearing where $\hat{S}$ is set to zero without further handling.

As shown in step 420, the following process is additionally performed in order to preserve the bound while finding a solution:

The second component $\hat{S}$ is determined in separate sub-steps. In sub-step 421, only $\hat{T}$, i.e. a linear combination linear combination of a product and square values of two chrominance components is determined. In a next sub-step 422, it is checked, whether or not $1-\hat{T}$ results in a positive or negative value. If $\hat{T} \leq 1$, then $\hat{S}$ is real and the decoding proceed with this $\hat{S}$ (sub-step 423), which corresponds to the processing shown in FIG. 3.

Figure 5:
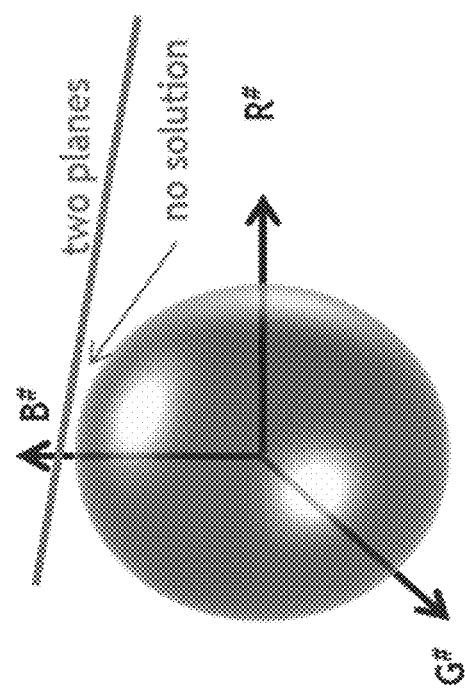
FIG. 5 illustrates possible solutions for intersections of a line and an ellipsoid in the $R^\#G^\#B^\#$ color space.
Figure 5:
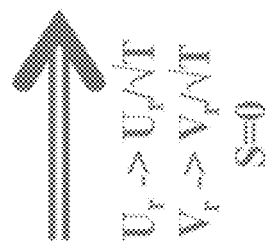
Figure 5:
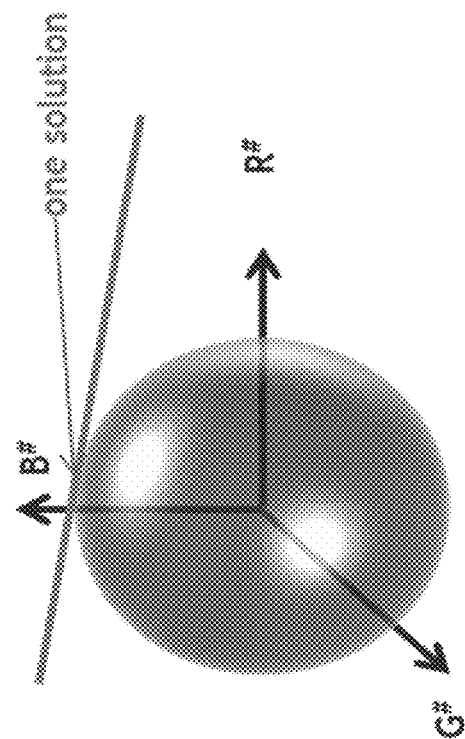

If $\hat{T}>1$, then S is imaginary and the processing continues with sub-step 424, where the variables $\hat{U}_r$ and $\hat{V}_r$ are re-scaled in order to get a real solution by doing the following
  set $\check{U}_r = \hat{U}_r / \sqrt{\hat{T}}$ and $\check{V}_r = \hat{V}_r / \sqrt{\hat{T}}$
  replace $\hat{U}_r, \hat{V}_r$ by $\check{U}_r, \check{V}_r$ in the remaining of the decoding
  set $\hat{S}=0$ The described processing provides a suitable solution, which becomes evident when analyzing the problem geometrically: The equation $$Y = A_1 \begin{bmatrix} R^{\#2} \\ G^{\#2} \\ B^{\#2} \end{bmatrix}$$

defines an ellipsoid in the $R^{\#}G^{\#}B^{\#}$ space, and $$\begin{bmatrix} A_2 \\ A_3 \end{bmatrix} \begin{bmatrix} R^{\#} \\ G^{\#} \\ B^{\#} \end{bmatrix} = \begin{bmatrix} U_r \\ V_r \end{bmatrix}$$

defines the intersection of two planes, i.e. a line, in the same space. Therefore, the solution is the intersection of the ellipsoid and the line. This intersection is either
 empty in the case S is imaginary
 one point in the case S=0, the line is tangent to the ellipsoid
 two points in the case S>0, and the positive value has to been take because $R^{\#}G^{\#}B^{\#}$ are positive by definition In FIG. 5, the ellipsoid and the line are shown in the $R^{\#}G^{\#}B^{\#}$ space. In FIG. 5, the ellipsoid is represented by a sphere. In case there is no solution, the line does not intersect the sphere (left). Setting S=0 is equivalent to increase, which itself is equivalent to inflate the ellipsoid that has $\sqrt{Y}$ as a radius. The chosen solution illustrated in FIG. 5 is to move the line up to a point it touches the ellipsoid (right). Then, by construction, the solution $R^{\#}G^{\#}B^{\#}$ is on the ellipsoid of radius $\sqrt{Y}$ and the bound is preserved.

In FIGS. 1 to 4, the steps and sub-steps may also be considered as modules or functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
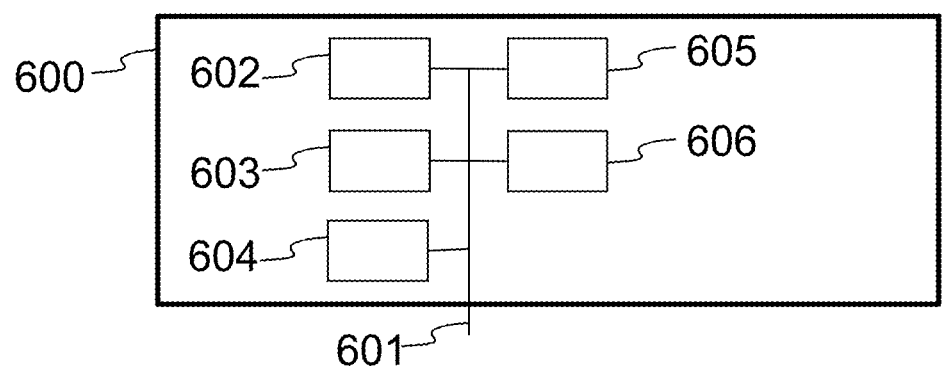
FIG. 6 shows an example of an architecture of a device in accordance with an embodiment of the disclosure.

FIG. 6 represents an exemplary architecture of a device 600 which may be configured to implement a method described in relation with FIG. 1 to 4.

Device 600 comprises the following elements that are linked together by a data and address bus 601:
 a microprocessor 602 (or CPU), which is, for example, a DSP (or Digital Signal Processor);
 a ROM (or Read Only Memory) 603;
 a RAM (or Random Access Memory) 604;
 an I/O interface 605 for transmission and/or reception of data, from an application; and
 a battery 606

According to a variant, the battery 606 is external to the device. Each of these elements of FIG. 6 are well-known by those skilled in the art and will not be disclosed further. In each of mentioned memory, the word «register» used in the specification can correspond to area of small capacity (some bits) or to very large area (e.g. a whole program or large amount of received or decoded data). ROM 603 comprises at least a program and parameters. Algorithm of the methods according to the disclosure is stored in the ROM 1303. When switched on, the CPU 602 uploads the program in the RAM and executes the corresponding instructions.

RAM 604 comprises, in a register, the program executed by the CPU 602 and uploaded after switch on of the device 600, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the color picture I is obtained from a source. For example, the source belongs to a set comprising:
 a local memory (603 or 604), e.g. a video memory or a RAM (or Random Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface (605), e.g. a wireline interface (for example a bus interface, a wide area network interface, a local area network interface) or a wireless interface (such as a IEEE 802.11 interface or a Bluetooth® interface); and
 a picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded picture is sent to a destination; specifically, the destination belongs to a set comprising:
 a local memory (603 or 604), e.g. a video memory or a RAM (or Random Access Memory), a flash memory, a ROM (or Read Only Memory), a hard disk;
 a storage interface, e.g. an interface with a mass storage, a RAM, a flash memory, a ROM, an optical disc or a magnetic support;
 a communication interface (605), e.g. a wireline interface (for example a bus interface, a wide area network interface, a local area network interface) or a wireless interface (such as a IEEE 802.11 interface or a Bluetooth® interface); and
 a display.

According to different embodiments of encoding or encoder, the bitstream BF and/or F are sent to a destination. As an example, one of bitstream F and BF or both bitstreams F and BF are stored in a local or remote memory, e.g. a video memory (604) or a RAM (604), a hard disk (603). In a variant, one or both bitstreams are sent to a storage interface, e.g. an interface with a mass storage, a flash memory, ROM, an optical disc or a magnetic support and/or transmitted over a communication interface (605), e.g. an interface to a point to point link, a communication bus, a point to multipoint link or a broadcast network.

According to different embodiments of decoding or decoder, the bitstream BF and/or F is obtained from a source. Exemplarily, the bitstream is read from a local memory, e.g. a video memory (604), a RAM (604), a ROM (603), a flash memory (603) or a hard disk (603). In a variant, the bitstream is received from a storage interface, e.g. an interface with a mass storage, a RAM, a ROM, a flash memory, an optical disc or a magnetic support and/or received from a communication interface (605), e.g. an interface to a point to point link, a bus, a point to multipoint link or a broadcast network.

According to different embodiments, device 1300 being configured to implement a decoding method described in relation with FIGS. 1 to 4, belongs to a set comprising:
- a mobile device;
- a communication device;
- a game device;
- a set top box;
- a TV set;
- a tablet (or tablet computer);
- a laptop;
- a display and
- a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
receiving a luminance component and chrominance components from a bitstream;
obtaining a further luminance component by linear combining the luminance component and the chrominance components;
obtaining a first component by applying a non-linear dynamic expansion function on the further luminance component such that a dynamic of the first component is increased compared to a dynamic of the further luminance component;
receiving a multiplicative factor from the bitstream;
obtaining a normalized multiplicative factor from the multiplicative factor and the first component;
recovering at least one color component of a color picture from the chrominance components and the first component by:
obtaining intermediate chrominance components from the chrominance components and the normalized multiplicative factor;
obtaining at least one intermediate color component from the intermediate chrominance components, the product of the intermediate chrominance components, and a color transform matrix; and displaying at least one color component of the decoded color picture obtained from the first component and one of the at least one intermediate color component.

2. The method of claim 1, wherein the at least one intermediate color component is obtained by:
  obtaining a second component by calculating a weighted linear combination of at least the squares of the intermediate chrominance components and the product of the intermediate chrominance components; and
  obtaining the at least one intermediate color component by multiplying the second component and the two intermediate chrominance components by the color transform matrix.

3. The method of claim 1, wherein the at least one intermediate color component is obtained by:
  obtaining a weighted linear combination from the intermediate chrominance components and the product of the intermediate chrominance components;
  checking whether the weighted linear combination is a positive or null value;
  when the weighted linear combination is a positive or null value,
    obtaining a second component by calculating a sum of the unity value with the weighted linear combination; and
    the at least one intermediate color component is obtained by multiplying the second component and the intermediate chrominance components by the color transform matrix;
  when the weighted linear combination is not a positive or null value,
    setting a second component to the null value;
    dividing the intermediate chrominance components by the weighted linear combination; and
    obtaining the at least one intermediate color component by multiplying the second component and the intermediate chrominance components once divided by the color transform matrix.

4. The method of claim 1, wherein the nonlinear dynamic expansion function is an inverse of a dynamic reduction function that has been applied to an original luminance component obtained when encoding the color picture.

5. The method of claim 1, wherein the normalized multiplicative factor depends on a backlight value obtained from the original luminance component.

6. The method of claim 1, wherein the second component is determined using a look up table.

7. An apparatus comprising:
  a receiver for receiving a luminance component, chrominance components, and a multiplicative factor from a bitstream;
  a processor configured to:
    obtain a further luminance component by linear combining the luminance component and the chrominance components;
    obtain a first component by applying a non-linear dynamic expansion function on the further luminance component such that a dynamic of the first component is increased compared to a dynamic of the further luminance component;
    obtain a normalized multiplicative factor from the multiplicative factor and the first component;
    recover at least one color component of a color picture from the chrominance components and the first component by:
      obtaining intermediate chrominance components from the chrominance components and the normalized multiplicative factor;
      obtaining at least one intermediate color component from the intermediate chrominance components, the product of the intermediate chrominance components, and a color transform matrix; and
  a display for displaying at least one color component of the decoded color picture obtained from the first component and one of the at least one intermediate color component.

8. The apparatus of claim 7, wherein the at least one intermediate color component is obtained by:
  obtaining a second component by calculating a weighted linear combination of at least the squares of the intermediate chrominance components and the product of the intermediate chrominance components; and
  obtaining the at least one intermediate color component by multiplying the second component and the two intermediate chrominance components by the color transform matrix.

9. The apparatus of claim 7, wherein the at least one intermediate color component is obtained by:
  obtaining a weighted linear combination from the intermediate chrominance components and the product of the intermediate chrominance components;
  checking whether the weighted linear combination is a positive or null value;
  when the weighted linear combination is a positive or null value,
    obtaining a second component by calculating a sum of the unity value with the weighted linear combination; and
    the at least one intermediate color component is obtained by multiplying the second component and the intermediate chrominance component by the color transform matrix;
  when the weighted linear combination is not a positive or null value,
    setting a second component to the null value;
    dividing the intermediate chrominance components by the weighted linear combination; and
    obtaining the at least one intermediate color component by multiplying the second component and the intermediate chrominance components once divided by the color transform matrix.

10. The apparatus of claim 7, wherein the nonlinear dynamic expansion function is an inverse of a dynamic reduction function that has been applied to an original luminance component obtained when encoding the color picture.

11. The apparatus of claim 7, wherein the normalized multiplicative factor depends on a backlight value obtained from the original luminance component.

12. The apparatus of claim 7, wherein the second component is determined using a look up table.

13. A non-transitory processor-readable storage medium having stored instructions that are operative, when executed by a processor, to cause the processor to:
  receive a luminance component and chrominance components from a bitstream;
  obtain a further luminance component by linear combining the luminance component and the chrominance components;
  obtain a first component by applying a non-linear dynamic expansion function on the further luminance component such that a dynamic of the first component is increased compared to a dynamic of the further luminance component;

receive a multiplicative factor from the bitstream;

obtain a normalized multiplicative factor from the multiplicative factor and the first component;

recover at least one color component of a color picture from the chrominance components and the first component by:
- obtaining intermediate chrominance components from the chrominance components and the normalized multiplicative factor;
- obtaining at least one intermediate color component from the intermediate chrominance components, the product of the intermediate chrominance components, and a color transform matrix; and display at least one color component of the decoded color picture obtained from the first component and one of the at least one intermediate color component.

14. A method comprising:
obtaining a first component by applying a non-linear dynamic reduction function on a luminance component of a color picture in order that the dynamic of the first component is decreased compared to the dynamic of the luminance component;

obtaining two chrominance components from color components of the color picture;

obtaining a further luminance component by linearly combining the first component and the two chrominance components; and encoding the further luminance component and the two chrominance components.

15. The method of claim 14, wherein the non-linear dynamic reduction function depends on a modulation value obtained by analyzing the color picture.

16. The method of claim 14, wherein the two chrominance components depend on a multiplicative factor that depends on the first component.

17. The method of claim 16, wherein the multiplicative factor further depends on a modulation value obtained by analyzing the color picture.

18. An apparatus comprising a processor configured to:
obtaining a first component by applying a non-linear dynamic reduction function on a luminance component of a color picture in order that the dynamic of the first component is decreased compared to the dynamic of the luminance component;

obtaining two chrominance components from color components of the color picture;

obtaining a further luminance component by linearly combining the first component and the two chrominance components; and encoding the further luminance component and the two chrominance components.

19. The apparatus of claim 18, wherein the non-linear dynamic reduction function depends on a modulation value obtained by analyzing the color picture.

20. The apparatus of claim 18, wherein the two chrominance components depend on a multiplicative factor that depends on the first component.

21. The apparatus of claim 20, wherein the multiplicative factor further depends on a modulation value obtained by analyzing the color picture.

22. A non-transitory processor-readable medium having stored instructions that are operative, when executed by a processor, to cause the processor to:
obtain a first component by applying a non-linear dynamic reduction function on a luminance component of a color picture in order that the dynamic of the first component is decreased compared to the dynamic of the luminance component;

obtain two chrominance components from color components of the color picture;

obtain a further luminance component by linearly combining the first component and the two chrominance components; and encode the further luminance component and the two chrominance components.

* * * * *